(12) United States Patent
Bauer et al.

(10) Patent No.: US 11,254,269 B2
(45) Date of Patent: Feb. 22, 2022

(54) CLOCK SPRING STEERING WHEEL POWER ASSEMBLY

(71) Applicant: SYMTEC, INC., Fridley, MN (US)

(72) Inventors: Joseph C. Bauer, Lindstrom, MN (US); Riley T. Harlan, Long Lake, MN (US); Tom Donnillon, Fridley, MN (US)

(73) Assignee: SYMTEC, INC., Fridley, MN (US)

( * ) Notice: Subject to any disclaimer, the term of this patent is extended or adjusted under 35 U.S.C. 154(b) by 70 days.

(21) Appl. No.: 16/719,600

(22) Filed: Dec. 18, 2019

(65) Prior Publication Data

US 2020/0189495 A1    Jun. 18, 2020

Related U.S. Application Data

(60) Provisional application No. 62/781,406, filed on Dec. 18, 2018.

(51) Int. Cl.
 *B60R 16/027* (2006.01)
 *B62D 65/14* (2006.01)
 *B62D 1/10* (2006.01)

(52) U.S. Cl.
 CPC .............. *B60R 16/027* (2013.01); *B62D 1/10* (2013.01); *B62D 65/14* (2013.01)

(58) Field of Classification Search
 None
 See application file for complete search history.

(56) References Cited

U.S. PATENT DOCUMENTS

| | | | |
|---|---|---|---|
| 5,046,951 A | * | 9/1991 | Suzuki ..................... B62D 1/10 439/15 |
| 5,773,776 A | | 6/1998 | Uleski et al. |
| 6,169,339 B1 | | 1/2001 | Cripe |
| 9,011,162 B2 | * | 4/2015 | Sato ..................... B60R 16/027 439/15 |
| 2006/0032062 A1 | | 2/2006 | Besier et al. |
| 2007/0054737 A1 | | 3/2007 | Burgel et al. |
| 2009/0156034 A1 | | 6/2009 | Araki et al. |
| 2011/0291392 A1 | | 12/2011 | Karlsson et al. |
| 2012/0138404 A1 | | 6/2012 | Neumann |
| 2019/0054502 A1 | | 2/2019 | Mayer et al. |
| 2019/0084502 A1 | * | 3/2019 | Bauer ................... B63H 25/02 |

OTHER PUBLICATIONS

International Search Report and Written Opinion from PCT Application PCT/US19/67231, dated Apr. 2, 2020, 10 pgs.

* cited by examiner

*Primary Examiner* — Vicky A Johnson
(74) *Attorney, Agent, or Firm* — Patterson Thuente Pedersen, P.A.

(57) ABSTRACT

The present invention is directed to systems for providing a pathway for at least one electrical conductor to supply current from a vehicle or marine craft power source to a steering wheel comprising at least one working element for heating or controls. The present invention utilizes a clock spring assembly inside a channel created by a housing mount and a housing base and encased in a housing cover for infinite rotation of the steering wheel while still maintaining a path for current to travel through the clock spring to the wheel.

13 Claims, 6 Drawing Sheets

CLOCK SPRING STEERING WHEEL POWER ASSEMBLY

RELATED APPLICATION

The present application claims the benefit of U.S. Provisional Application No. 62/781,406 entitled "CLOCK SPRING STEERING WHEEL POWER ASSEMBLY", filed Dec. 18, 2018, which is incorporated herein by reference in its entirety.

TECHNICAL FIELD

The present disclosure generally relates to systems for providing a pathway for at least one electrical conductor from a power source to a steering wheel of a vehicle.

BACKGROUND OF THE INVENTION

A variety of devices and systems have been developed for providing comfort in heating steering wheels. A primary problem exists in many of these solutions as the heating element on the steering wheel must be supplied with current.

One solution was to create a steering wheel sleeve. For example, in U.S. Pat. No. 4,549,069 an electrically heated cover for a steering wheel is disclosed. The cover is in the shape of an annularly extending cylindrical sleeve parted along a line on said sleeve facing and parallel to the rim of the steering wheel to be mounted on and enclose said rim. The sleeve contains an array of electrically energized heating elements and thermal insulation disposed between the heating elements and the rim when the sleeve is mounted in order to inhibit the flow of heat into the steering wheel and the steering column.

Another method is to provide an electrical pathway through the steering column. For most, the wire connecting a power source to the heating element in the steering wheel must pass through the stationary steering column. This creates an immediate problem because the steering wheel itself must turn relative to the stationary steering column. As a result, it is common to have problems managing the wire as it moves with the continually rotating steering wheel. There is also a problem of protecting the internal current transfer system from dust and the elements.

Thus there is a need for a device that transfers power and control signals from a steering wheel to the vehicle, and vice versa, while maintaining a seal to prevent dust and water intrusion.

SUMMARY OF THE INVENTION

The present invention is directed to systems for providing a pathway for at least one electrical conductor from a power source to a steering wheel comprising at least one working element therein or thereon. The working element of the steering wheel may comprise an exemplary heating element to which the electrical conductor(s) connect. Alternatively, the steering wheel may comprise controllers for vehicle functions, e.g., radio, telephone and the like to which the electrical conductor(s) connect. More specifically, several embodiments of the invention comprise an electrical conductor pathway from a power source and on/off switch through the steering column to exemplary steering wheel heating elements with accommodation for the continuous winding and unwinding that occurs when the steering wheel is turned relative to the steering column which remains stationary. Specifically, the present invention is an element resistant clock spring assembly for rotation of the steering wheel.

The present invention generally includes a base, which may be constructed of aluminum; an O-ring seal about the base; a ribbon cable disposed between the base and rotation separator; a rotary shaft seal with a wiper lip disposed axially within the ribbon cable; a rotary shaft seal with wiper lip disposed on the opposing face of the rotation separator and an upper plastic housing.

In an embodiment the invention is a clock spring steering wheel power assembly for providing current to a steering wheel while allowing for infinite rotation of the steering wheel, the steeling wheel power assembly comprising; a housing mount for connection to a vehicle or a marine craft; a clock spring assembly connected to the housing mount, said clock spring assembly including an electrical connection to the vehicle or a marine craft at a first end and the steering wheel at a second end; a housing base assembly disposed to freely rotate within the clock spring assembly, said second end of the clock spring assembly extending through the housing base; and a housing cover that connects to the housing base, said housing base holding the clock spring assembly and the housing mount.

The clock spring steering wheel power assembly may contain an O-ring disposed between the housing cover and the housing base assembly.

The clock spring steering wheel power assembly may contain a plurality of clips disposed about a perimeter of the housing cover, said clips engaging receptacles within the housing base assembly.

The clock spring steering wheel power assembly may contain an inner dual lip seal disposed between the housing base assembly and the housing mount, said inner dual lip seal is maintained in place by an inner seal spring clip. The clock spring steering wheel power assembly may also include an outer dual lip seal is disposed between the housing mount and the housing cover, wherein the outer dual lip seal is maintained in place by an outer seal spring clip.

The clock spring steering wheel power assembly may include an electrical connection to the clock spring assembly that is a post electrode.

The clock spring steering wheel power assembly includes at the second end of the clock spring assembly a conductor that is passed through a fixed housing to an electrical connector post. There may instead be multiple conductors passed through a fixed housing to an electrical connector post.

The clock spring steering wheel power assembly includes a geometry wherein the housing cover, the housing base and the housing mount assembly define a channel for the clock spring assembly, said channel dimensioned for clock spring expansion and contraction based on rotation.

In an embodiment, the present invention includes a clock spring steering wheel power assembly for providing current to a steering wheel while allowing for infinite rotation of the steering wheel, the steering wheel clock spring power assembly comprising; a fixed housing mount, said fixed housing mount including a pair of posts extending from a first face and a clock spring base extending from an opposing face; a rotatable housing base that includes a cylindrical base post that mates with an aperture in the clock spring base of the housing mount; a clock spring that is disposed about the clock spring base; and a housing cover that forms a cylinder about the clock spring and the housing mount; said housing cover including fasteners to connect with the housing base; wherein said clock spring and housing base may rotate freely clockwise or counterclockwise more than 360 degrees while still maintaining an electrical connection to the housing mount.

The clock spring steering wheel power assembly may further include an inner dual lip seal and an outer dual lip seal, wherein the inner dual lip seal is positioned between the housing base and the housing mount and the outer dual lip seal is positioned housing cover and the housing mount.

The present invention may further include a method of supplying current to a steering wheel across an infinitely rotating joint, the method comprising;

connecting a steering wheel to a housing base, said housing base including a hollow shaft to engage a steering assembly of a vehicle or marine craft;

connecting a housing mount to the vehicle or marine craft;

disposing a clock spring between the housing mount and the housing base, said clock spring fixedly attached to the housing mount at a first end and rotatably connected to the housing base at the second end; and connecting an electrical power line to the clock spring through the housing mount;

wherein a current travels from through the clock spring and then to the steering wheel.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present invention is a clock spring steering wheel power assembly that provides for power to travel from a vehicle or marine craft, through a clock spring steering wheel power assembly to a steering wheel. The steering wheel allows for a variety of controls or for steering wheel heating while allowing infinite rotations of the steering wheel.

FIGS. 1 through 5 are views of a steering wheel 20 with clock spring steering wheel power assembly 10 attached. The clock spring steering wheel power assembly 10 is generally disposed between a steering wheel 20 and a steering unit of the vehicle or marine craft. A power line extends through the steering unit or steering assembly to the clock spring steering wheel power assembly 10. While not shown, a steering shaft extends from the steering unit, through the clock spring steering wheel power assembly 10 to the steering wheel 20. The shaft is connected to the steering wheel 20 by any conventional fastening means. The steering wheel 20 and steering unit may be found on a marine craft, an automobile or other motorized or non-motorized vehicles.

Figure 1:
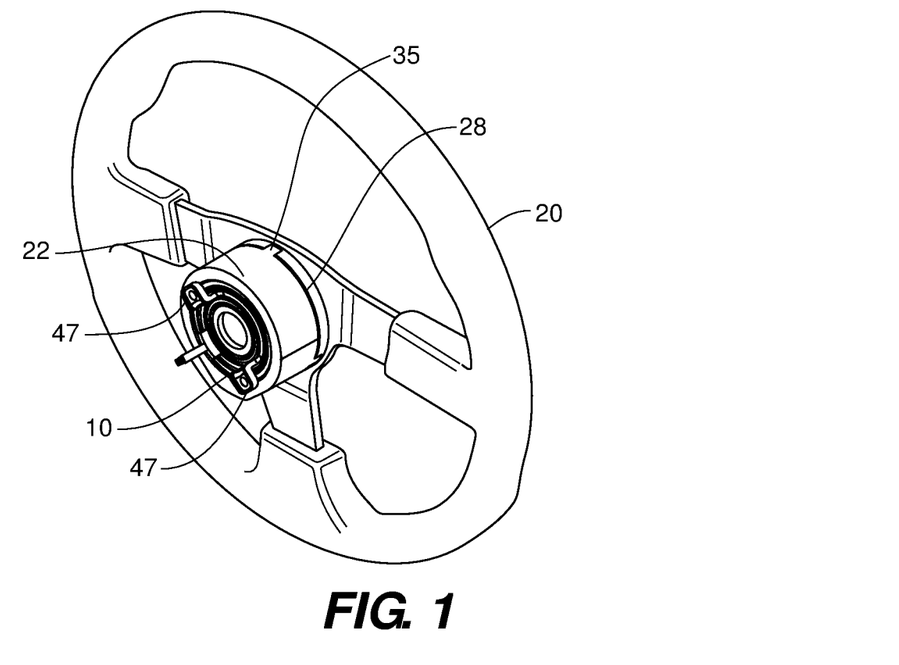
FIG. 1 is a perspective view of the steering wheel and clock spring power assembly.
Figure 2:
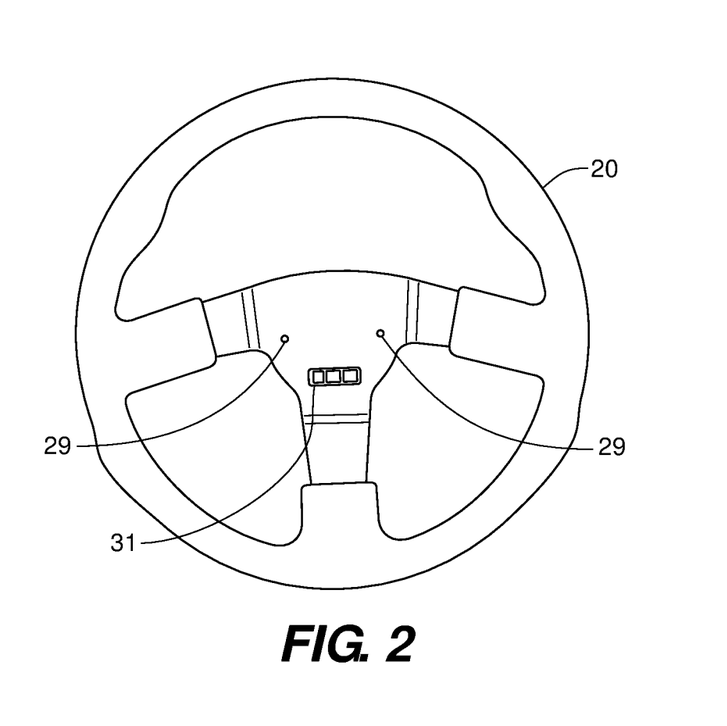
FIG. 2 is a front plan view of the steering wheel.
Figure 3:
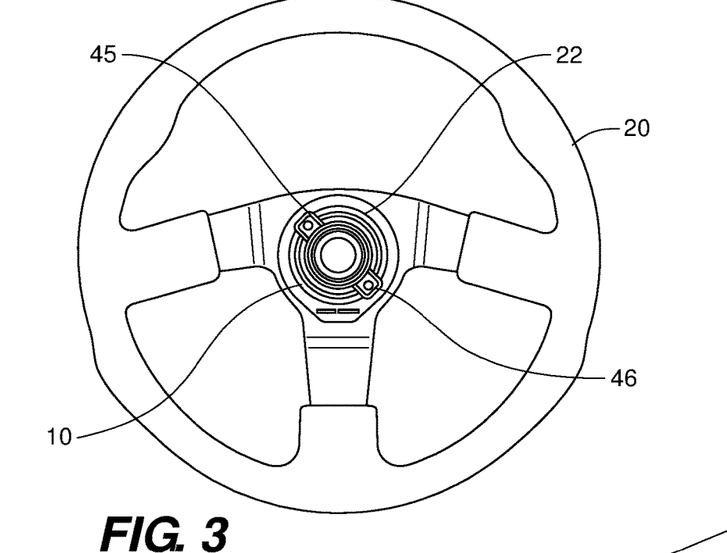
FIG. 3 is a rear plan view of the steering wheel.

FIG. 2 is a front plan view of the steering wheel 20. In a first embodiment, at the center of the steering wheel 20 an electrical connector post 31 is disposed to provide an electrical connection to any of the accessories mounted to or controlled by steering wheel controls. FIG. 3 illustrates the rear view of the steering wheel 20 with the clock spring steering wheel power assembly 10.

Figure 4:
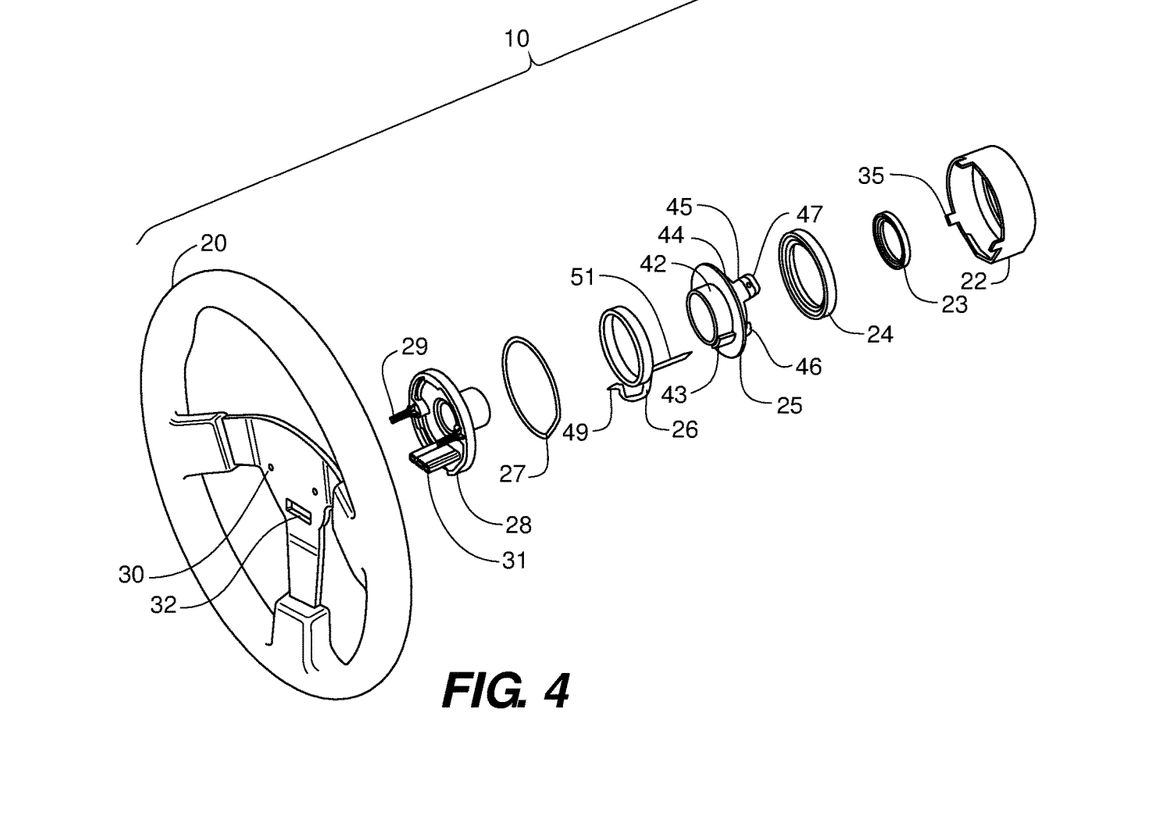
FIG. 4 is an exploded perspective view of the steering wheel and clock spring power assembly.

FIG. 4 is an exploded perspective view of the elements of an embodiment of clock spring steering wheel power assembly 10. The clock spring steering wheel power assembly 10 is comprised of a housing cover 22, an inner double lip ring 23, a double lip outer slip ring 24, a housing mount 25, a clock spring 26, an O-ring 27, and a housing base 28. The housing base 28 may include a pair of opposing forward facing fastener mounts 29 that extend axially through mounting holes 30 in the steering wheel 20. Steering wheel 20 further includes electrical connector aperture 32. Electrical connector post 31 extends axially from housing base 28 through electrical connector aperture 32.

Figure 5:
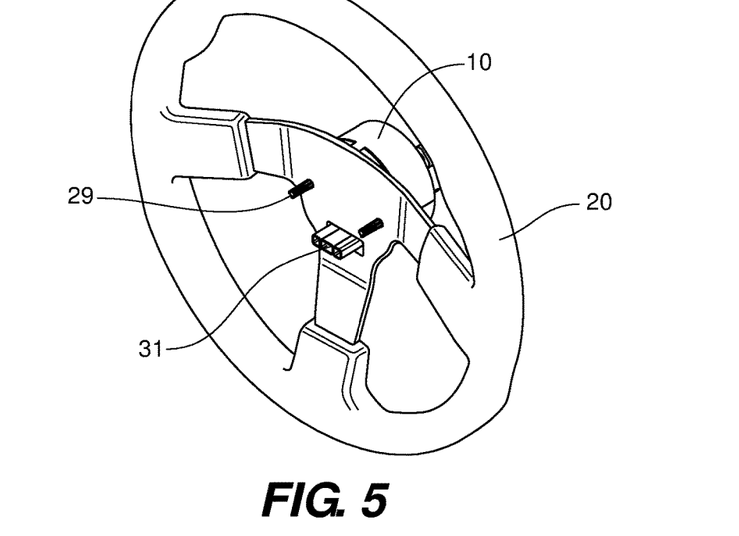
FIG. 5 is a front perspective view of the steering wheel and clock spring power assembly.

FIG. 5 depicts a perspective view of the steering wheel 20 with the mounted clock spring steering wheel power assembly 10. The electrical connector post 31 extends axially from housing base 28 through electrical connector aperture 32. Opposing forward facing fastener mounts 29 extend axially through mounting holes 30 in the steering wheel 20. The number of fastener mounts and their relative position through the steering wheel can be varied according to the design of the steering wheel and the placement of the electrical connections.

Figure 6:
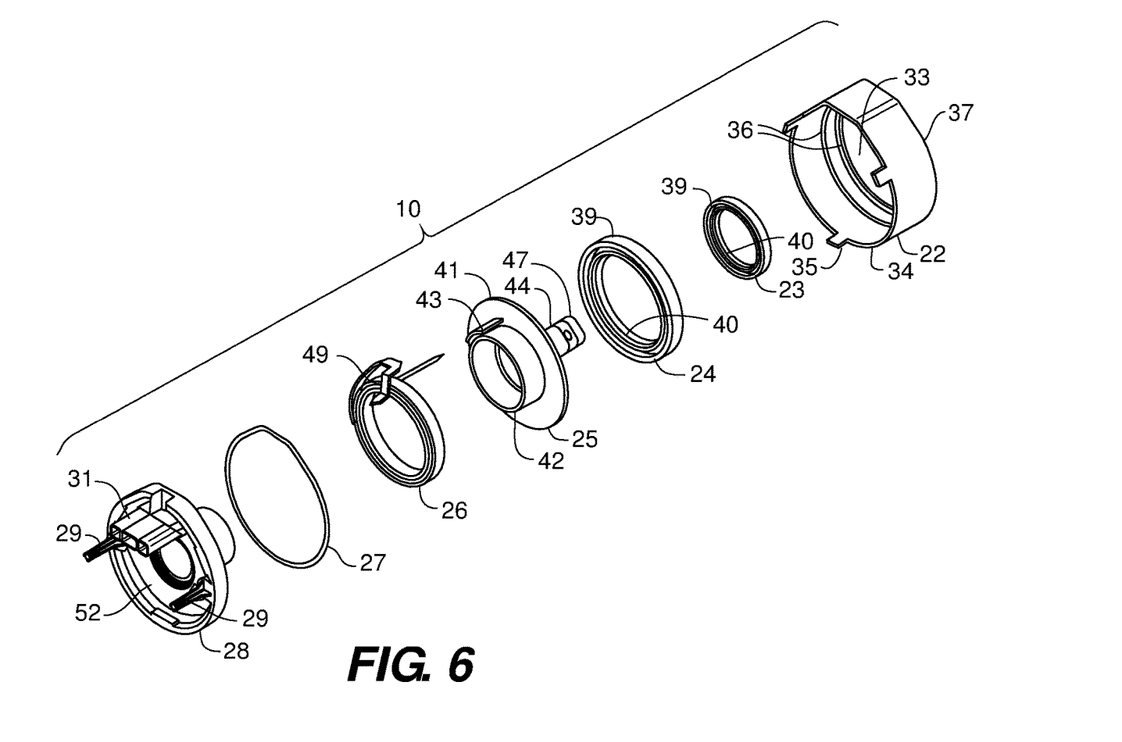
FIG. 6 is a perspective exploded view of a clock spring power assembly.

FIG. 6 is a perspective exploded view of a clock spring power assembly 10. Note that FIG. 4 and FIG. 6 illustrate the same clock spring steering wheel power assembly 10 but with a different rotation as noted by the housing mount 25.

The clock spring steering wheel power assembly 10 is comprised of a housing cover 22, an inner double lip ring 23, a double lip outer slip ring 24, a housing mount 25, a clock spring 26, an O-ring 27, and a housing base 28.

Housing cover 22 is generally cylindrical in shape and defines an open central channel 33. The housing cover 22 includes a series of clips 35 disposed about the perimeter of the cover mating face 34. Clips 35 include a flange or engagement feature for fixedly connecting to the housing base 28. The housing cover 22 includes a lip 36 on the opposing external side 37 for maintaining the elements of the clock spring power assembly 10 within the cover 22.

To seal the clock spring power assembly 10 from environmental conditions an inner double lip ring 23 and a double lip outer slip ring 24 are positioned on opposing sides of the housing mount 25. Inner double lip ring 23 and double lip outer slip ring 24 may have a similar construction with a smooth continuous outer perimeter 39 and a varied geometry for the inner perimeter 40 to allow for compression sealing. A clip 38, such as a spring clip may be used to maintain relative positions of inner double lip ring 23 and a double lip outer slip ring 24 relative to the housing mount 25.

In FIG. 6, housing mount 25 includes a circular central flange 41 that has a diameter sized to closely fit within the housing cover 22. Extending axially from the central flange 41 towards the housing base 28 is the clock spring base 42. The clock spring base 42 is a cylinder that defines an on aperture for mating with the housing base 28. Housing mount 25 may also include cable access 43 extending from the central flange 41 for maintaining position of the clock spring 26. On the opposing side of circular central flange 41 is the steering shaft aperture 44. Extending from steering shaft aperture are a pair of opposing arms 45 and 46 that extend towards the inner double lip ring 23 and double lip outer slip ring 24. Arms 45 and 46 include a mounting flange 47 at their distal end. Cable housing 50 includes at least one axial path way 48 for supplying power through clock spring steering wheel power assembly 10. The steering shaft aperture 44 has a diameter greater than the diameter of the clock spring base 42.

Clock spring 26 is comprised of a flat flexible cable. The inner diameter of clock spring 26 wraps around the clock spring base 42 and rests on circular central flange 41. Clock spring 26 includes steering wheel connector 49, which extends from the outer perimeter of clock spring 26 toward the housing base 28. Steering wheel connector 49 includes a series of right angle steps to direct the cable from an outer diameter of the housing mount 25 to the electrical connector post 31 of the housing base 28. A vehicle connector cable 51 extends axially from clock spring 26 to the housing mount 25. Cable access 43 of the housing mount 25 defines an aperture for vehicle connector cable 51.

Housing base 28 includes upper face 52 from which connector posts 29 and electrical connector posts 31 extend toward the steering wheel 20. On the opposing side from upper face 52 is clock spring face 53. Clock spring face 53 includes a cylindrical base post 54 that mates with housing mount 25. A planar shelf 55 extends from the outer perimeter of cylindrical base post 54 to the outer perimeter of housing base 28. O-ring 29 is disposed with o-ring channel 56 about the perimeter of housing base 28 to provide a seal with housing cover 22.

Figure 7:
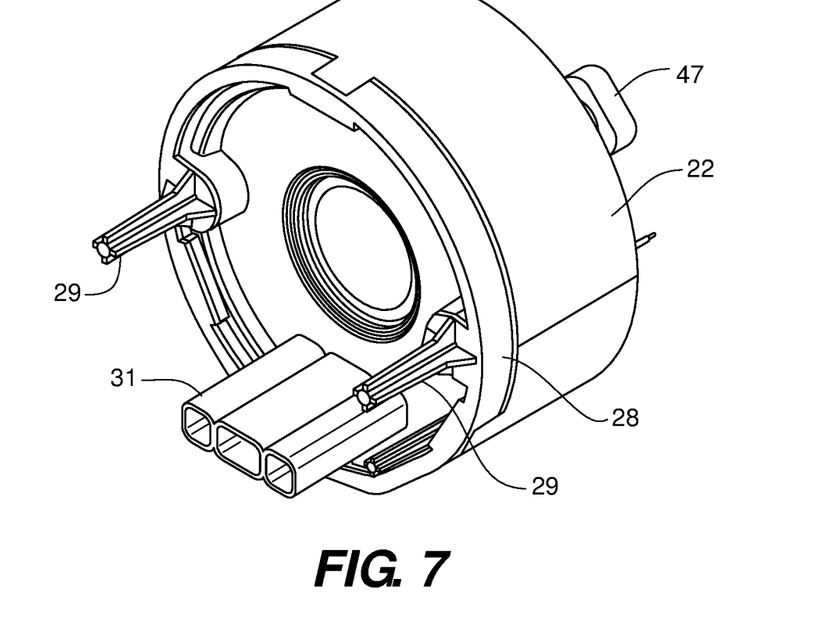
FIG. 7 is a front side perspective view of a clock spring power assembly.
Figure 8:
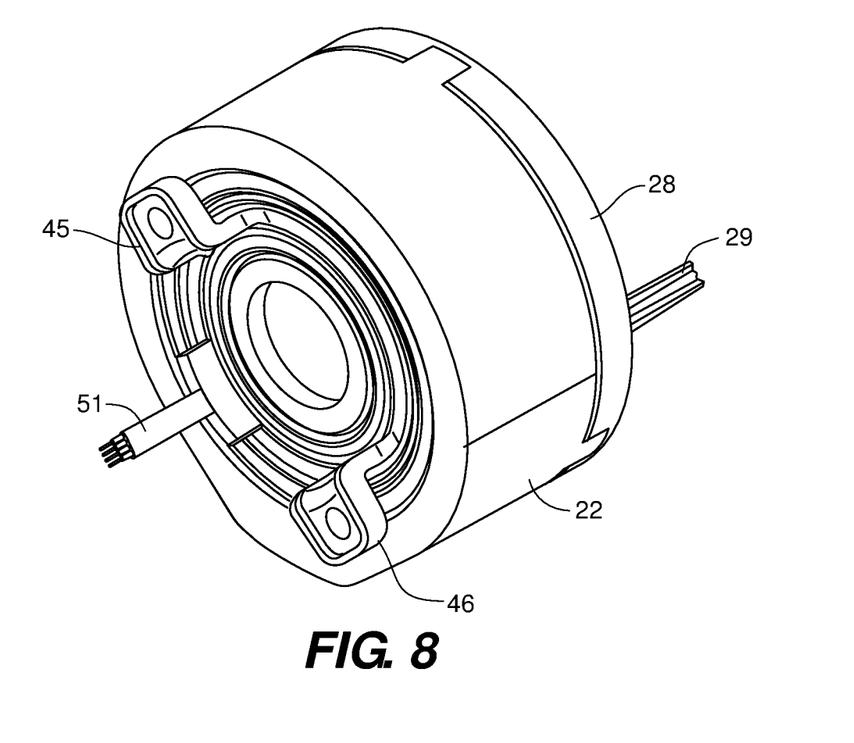
FIG. 8 is a rear side perspective view of a clock spring power assembly.

FIGS. 7 and 8 illustrate the clock spring steering wheel power assembly 10 in perspective view. FIG. 7 depicts a view from the steering wheel side. Connector posts 29 extend axially away from housing base 28. Connector posts 29 may have a variety of shapes and dimensions according to the mating requirements with the steering wheel. Electrical connector posts 31 are illustrates with multiple channels.

FIG. 8 illustrates a perspective view of the clock spring steering wheel power assembly 10 from the side of the land or water vehicle. Extending axially from clock spring steering wheel power assembly 10 are the vehicle connector cable 51 and the opposing arms 45 and 46 of the housing mount 25

Figure 9:
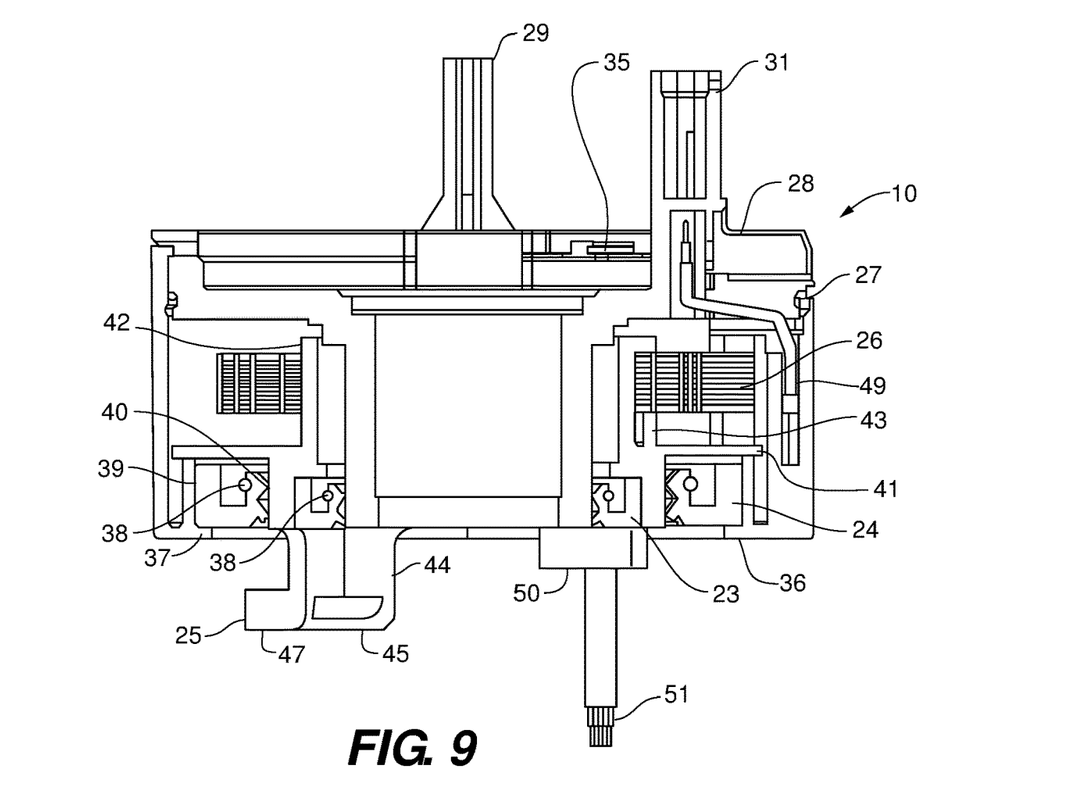
FIG. 9 is a cross sectional view of the clock spring power assembly.
Figure 10:
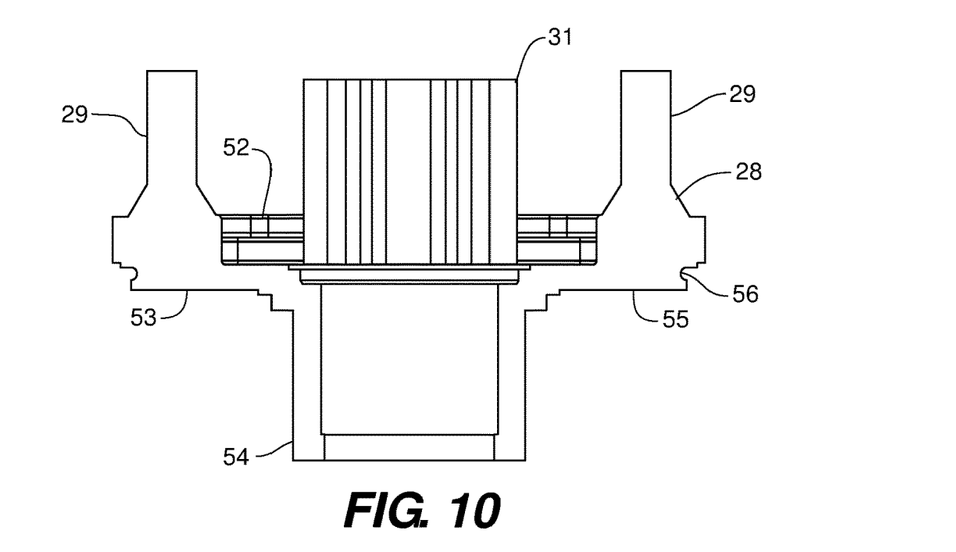
FIG. 10 is a cross sectional view of the housing base of the clock spring power assembly.
Figure 11:
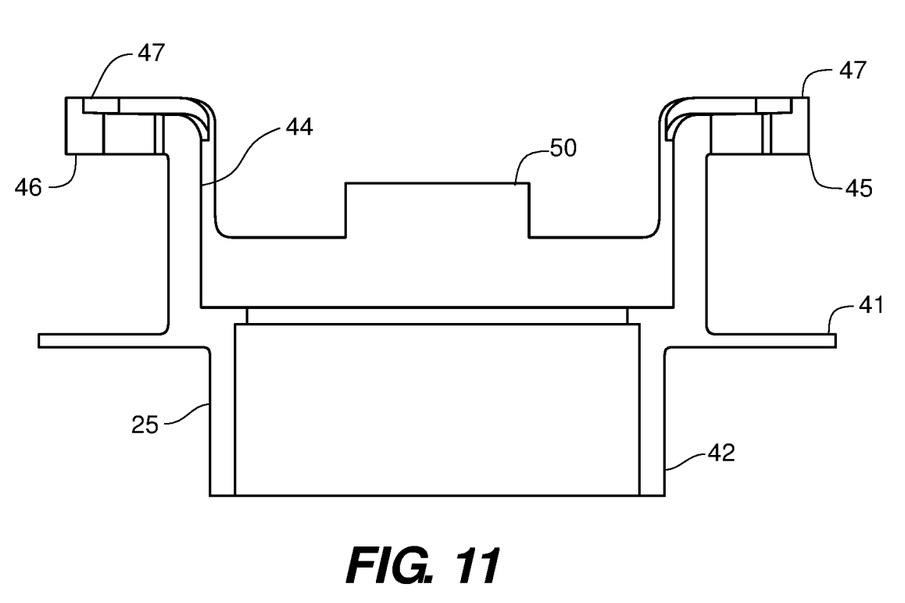
FIG. 11 is cross sectional view of the housing mount of the clock spring power assembly.

FIGS. 9-11 depict cross sectional views of the clock spring steering wheel power assembly 10 and components housing mount 25 and housing base 28. As depicted in FIG. 9 inner dual lip seal 23 is positioned between housing base 28 and housing mount 25. Outer dual lip seal 24 is positioned between outer housing cover 22 and housing mount 25. Clips 38 are used to lock the outer dual slip 24 and inner dual slip 23 in relative position about housing base 28 and housing mount 25.

In operation, electrical current is provided to the steering wheel 20 through vehicle connector cable 51 to the clock spring 26. Steering wheel connector 49 then supplies current from the clock spring 26 to the steering wheel through the apertures 31 in housing base 28. Housing mount 25 is in a fixed position relative to the housing base 28. The housing mount 25 is connected to the marine or land vehicle. Conversely, housing base 28 is free to rotate 360 degrees with the steering wheel 20. The clock spring 26 provides a flexible connection across the rotating joint.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

The invention claimed is:

1. A clock spring steering wheel power assembly for providing current to a steering wheel while allowing for infinite rotation of the steering wheel, the steeling wheel power assembly comprising;
    a housing mount for connection to a vehicle or a marine craft;
    a clock spring assembly connected to the housing mount, said clock spring assembly including an electrical connection to the vehicle or a marine craft at a first end and the steering wheel at a second end;
    a housing base assembly disposed to freely rotate within the clock spring assembly, said second end of the clock spring assembly extending through the housing base;
    a housing cover that connects to the housing base, said housing base holding the clock spring assembly and the housing mount, and
    wherein an O-ring is disposed between the housing cover and the housing base assembly.

2. The clock spring steering wheel power assembly of claim 1 wherein a plurality of clips are disposed about a perimeter of the housing cover, said clips engaging receptacles within the housing base assembly.

3. The clock spring steering wheel power assembly of claim 1 wherein an inner dual lip seal is disposed between the housing base assembly and the housing mount.

4. The clock spring steering wheel power assembly of claim 3 wherein the inner dual lip seal is maintained in place by an inner seal spring clip.

5. The clock spring steering wheel power assembly of claim 1 wherein an outer dual lip seal is disposed between the housing mount and the housing cover.

6. The clock spring steering wheel power assembly of claim 5 wherein the outer dual lip seal is maintained in place by an outer seal spring clip.

7. The clock spring steering wheel power assembly of claim 1 wherein the electrical connection to clock spring assembly is a post electrode.

8. The clock spring steering wheel power assembly of claim 1 wherein the second end of the clock spring assembly includes a conductor that is passed through a fixed housing to an electrical connector post.

9. The clock spring steering wheel power assembly of claim 8 wherein multiple conductors are passed through the fixed housing to the electrical connector post.

10. The clock spring steering wheel power assembly of claim 1 wherein the housing cover, the housing base and the housing mount assembly define a channel for the clock spring assembly, said channel dimensioned for clock spring expansion and contraction based on rotation.

11. A clock spring steering wheel power assembly for providing current to a steering wheel while allowing for infinite rotation of the steering wheel, the steeling wheel clock spring power assembly comprising;
- a fixed housing mount, said fixed housing mount including a pair of posts extending from a first face and a clock spring base extending from an opposing face;
- a rotatable housing base that includes a cylindrical base post that mates with an aperture in the clock spring base of the housing mount;
- a clock spring that is disposed about the clock spring base; and
- a housing cover that forms a cylinder about the clock spring and the housing mount; said housing cover including fasteners to connect with the housing base;
- wherein said clock spring and housing base may rotate freely clockwise or counterclockwise more than 360 degrees while still maintaining an electrical connection to the housing mount.

12. A clock spring steering wheel power assembly of claim 11 further including an inner dual lip seal and an outer dual lip seal, wherein the inner dual lip seal is positioned between the housing base and the housing mount and the outer dual lip seal is positioned between the housing cover and the housing mount.

13. A method of supplying current to a steering wheel across an infinitely rotating joint, the method comprising;
- connecting a steering wheel to a housing base, said housing base including a hollow shaft
- connecting a housing mount to a vehicle or marine craft;
- disposing a clock spring between the housing mount and the housing base, said clock spring fixedly attached to the housing mount at a first end and rotatably connected to the housing base at the second end; wherein a housing cover forms a cylinder about the clock spring and the housing mount and an O-ring is disposed between the housing cover and the housing base, and
- connecting an electrical power line to the clock spring through the housing mount;
- wherein a current travels from through the clock spring and then to the steering wheel.

* * * * *